UNITED STATES PATENT OFFICE.

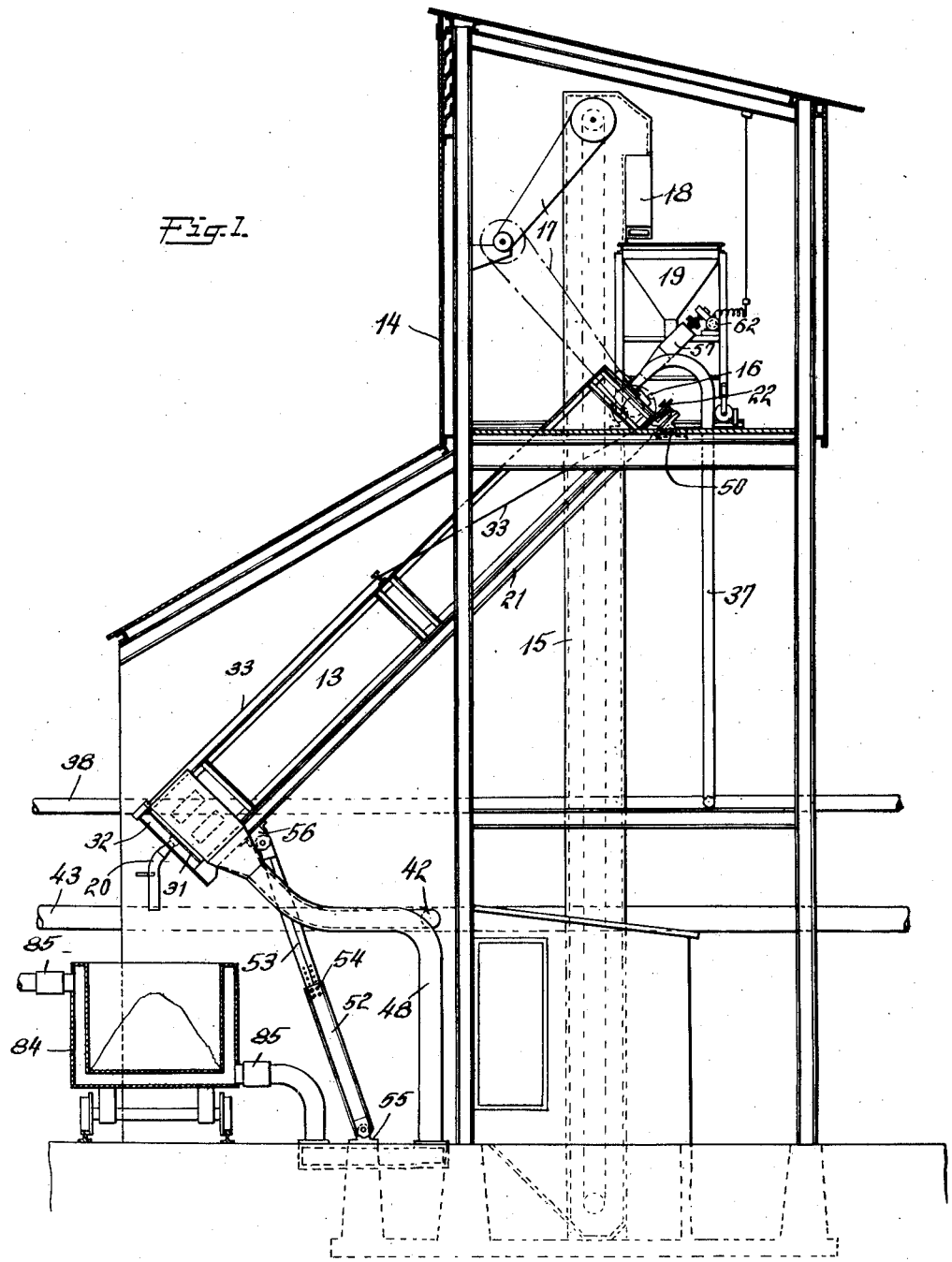

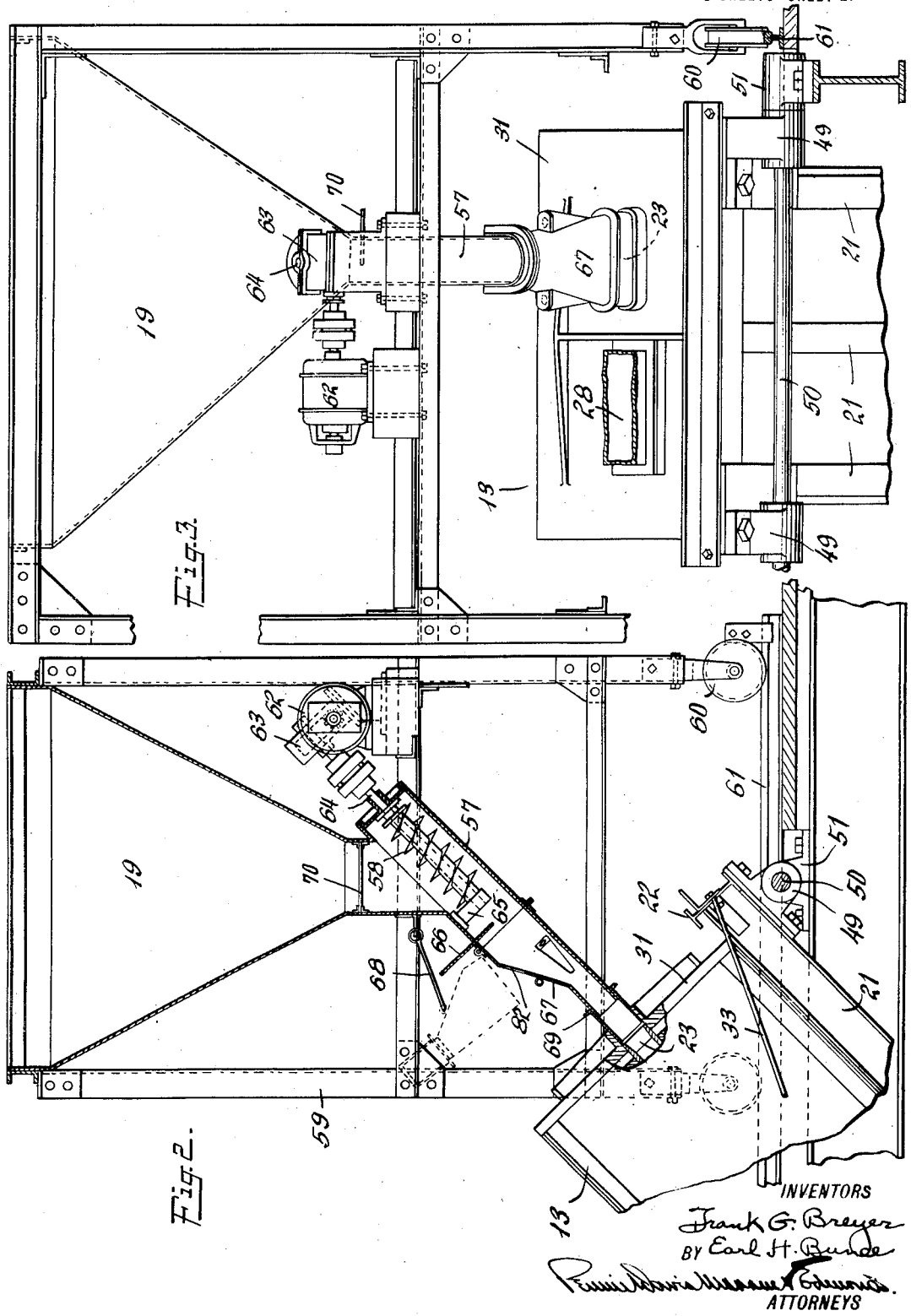

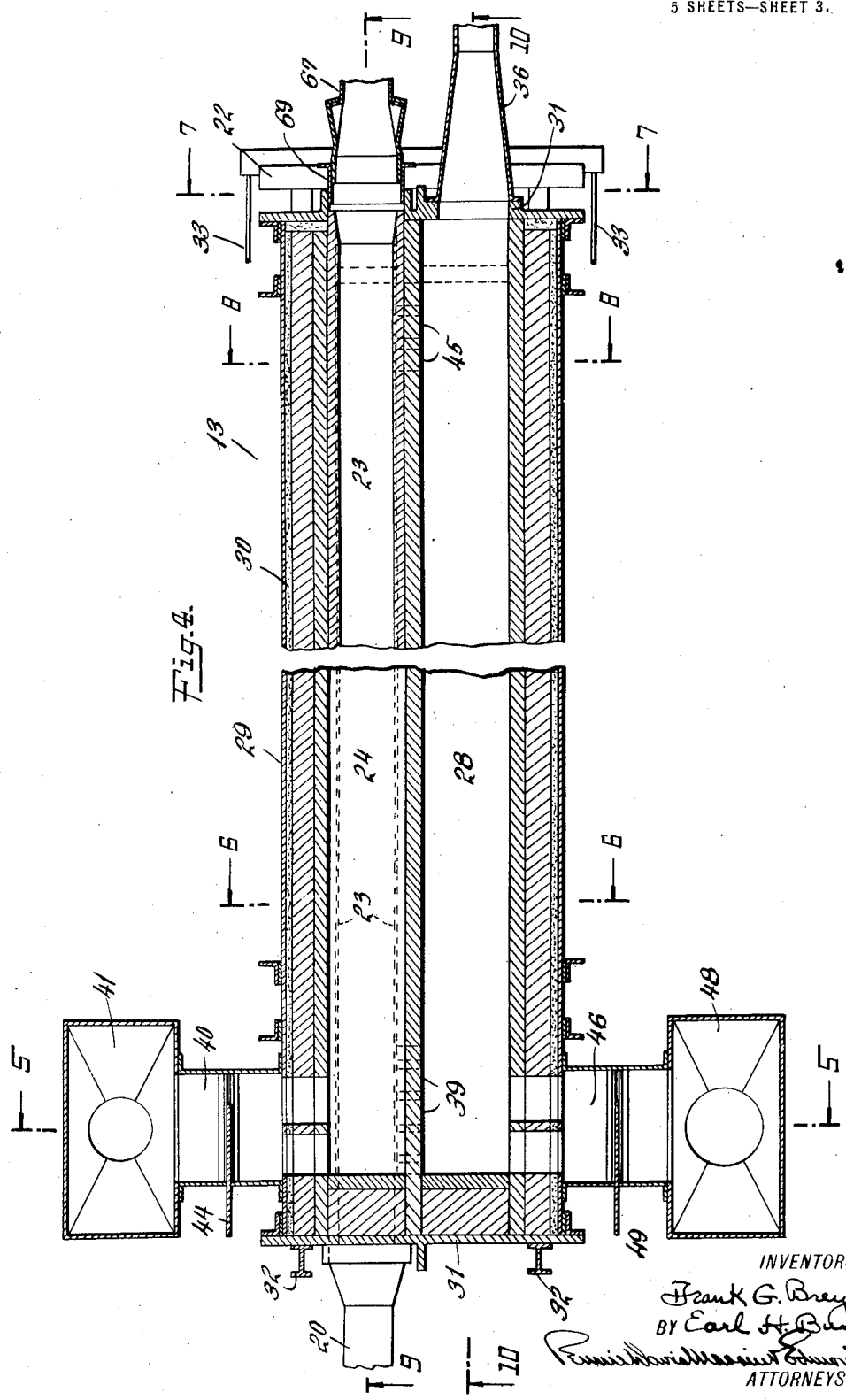

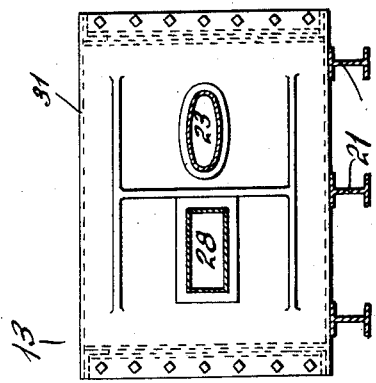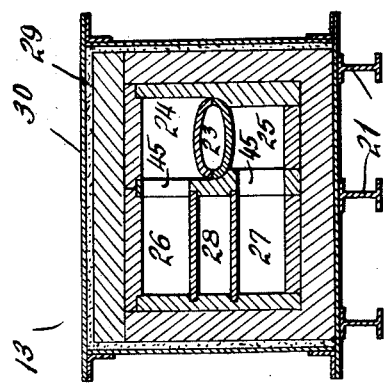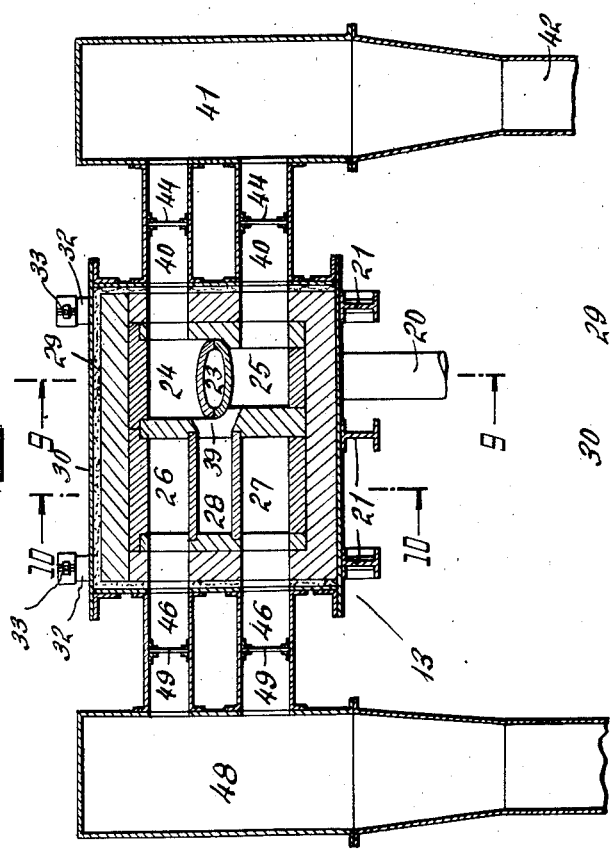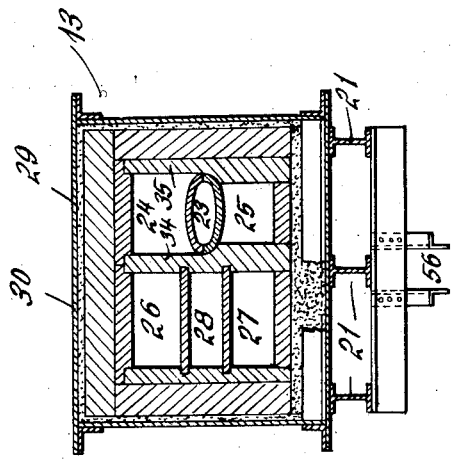

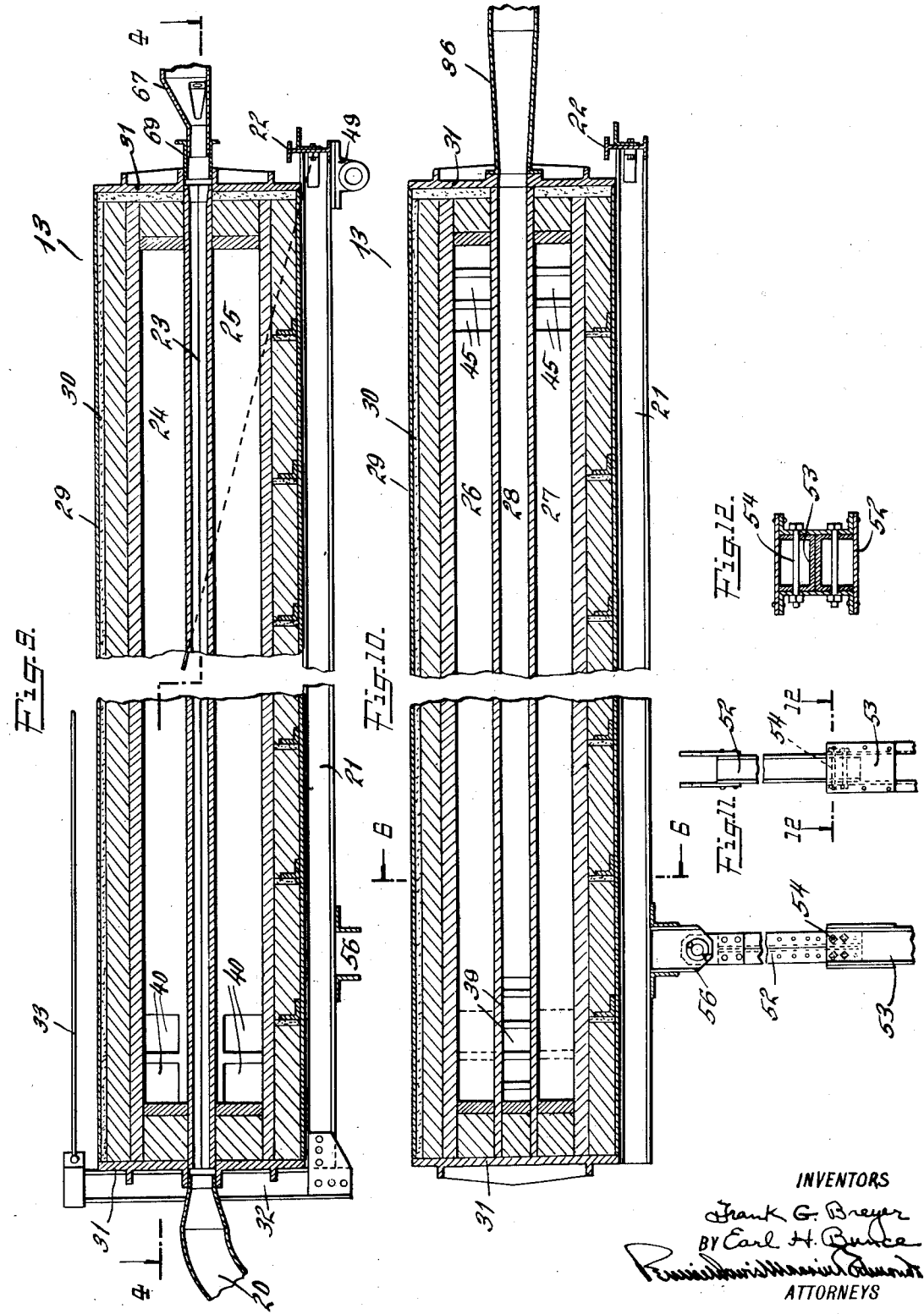

FRANK G. BREYER AND EARL H. BUNCE, OF PALMERTON, PENNSYLVANIA, ASSIGNORS TO THE NEW JERSEY ZINC COMPANY, OF NEW YORK, N. Y., A CORPORATION OF NEW JERSEY.

TREATING ZINC OXID.

1,339,545.      Specification of Letters Patent.      Patented May 11, 1920.

Application filed August 9, 1918. Serial No. 249,046.

*To all whom it may concern:*

Be it known that we, FRANK G. BREYER, a citizen of the United States, residing in Palmerton, Carbon county, State of Pennsylvania, and EARL H. BUNCE, a citizen of the United States, residing at Palmerton, Carbon county, State of Pennsylvania, have invented certain new and useful Improvements in Treating Zinc Oxid; and we do hereby declare the following to be a full, clear, and exact description of the invention, such as will enable others skilled in the art to which it appertains to make and use the same.

This invention is directed to the provision of an improved process for treating zinc oxids, such as the French process oxids, which are substantially free from lead, as well as leaded zinc oxids, by reheating, to improve their color and thus increase their value as pigments.

In the procedure heretofore commonly followed for reheating zinc oxids, horizontal retorts have been utilized, the zinc oxid being generally charged into the retorts manually to a depth of about five inches. The ends of the retorts are vented so as to permit the escape of volatilized impurities and combustible vapors, and to permit the workmen to turn the charge over from time to time to expose fresh surfaces to the heat conducted inwardly from the walls of the retorts. Such retorts may, however, be entirely filled, and the reheating carried out without subsequent turning over of the charge until its removal. The zinc oxid is itself a poor conductor of heat, and it is difficult to heat the center of the charge to the desired degree, or, if the center be heated sufficiently, the portions of the charge lying adjacent to the walls of the retort are heated to too high a degree. Such reheating of the zinc oxid consumes a number of hours, and is usually but moderately efficient.

The present invention aims to overcome such objections and involves the provision of a process for the treatment of zinc oxid whereby uniformity of reheating is obtained, while the operation of reheating consumes but a small amount of time and yields a superior product.

In a copending application, filed August 9, 1918, Serial No. 249,045, we have described an improved process of treating zinc oxids which comprises, broadly, passing the zinc oxid by the action of gravity through a relatively long chamber or flue heated to such a temperature that substantially every particle of the oxid is subjected during its passage through the chamber to the necessary degree of heat required to effect the desired improvement in its color. This copending application describes specifically a mode of practising the invention in which the heating chamber or flue, through which the zinc oxid passes, is disposed in a substantially vertical position so that practically no resistance or impediment is offered to the passage of the zinc oxid therethrough by contact with the walls of the chamber, and the oxid thus falls freely therethrough. In order that the zinc oxid may be exposed to the heating influence for a sufficient length of time to effect the desired reaction, the heating chamber is made relatively long; and in order to uniformly expose the oxid to the heating influence, the chamber is made of oblong or elongated cross-section, so that the oxid passes therethrough in the form of a relatively thin stream or sheet.

The present invention is directed to a specific modification of the invention described in said copending application, and while it involves the general feature of passing the oxid through a relatively long heating chamber by the action of gravity, it provides for decreasing or moderating by friction the velocity of the particles of zinc oxid in their downward passage through the heating chamber so that the movement of the particles therethrough is more or less in the nature of a sliding or gliding motion, as distinguished from the free falling of the particles which characterizes their passage through a substantially vertical heating chamber.

The sliding or gliding motion of the particles through the heating chamber, which characterizes the present invention, is effected by arranging the chamber in an inclined position, and the inclination may be more or less sharp, depending upon the amount of resistance which it is desired to offer to the passage of the particles through the chamber. It is to be understood, however, that the inclination is always steep enough to insure by the action of gravity alone a sufficient velocity of the particles to prevent any objectionable tendency of the oxid to granulate or nodulize during its passage through the heating chamber.

In other respects, the process of reheating the zinc oxid in accordance with the present invention is more or less similar to the process described in our copending application. Thus, in order to insure a uniform exposure of all of the particles of the oxid to the necessary degree of heat, the oxid is passed through the heating chamber in the form of a thin or shallow layer or stream, and this result is preferably effected by constructing the heating chamber or flue of elongated cross-section. The walls of the chamber are maintained during the passage of the zinc oxid therethrough at a temperature varying between a dull red and a bright yellow color. The heating chamber is preferably open at both ends so as to obtain an upward draft of air therethrough for furnishing an adequate supply of oxygen to the zinc oxid while the latter is undergoing the reheating treatment.

The zinc oxid, after passing through the heating chamber may be maintained at the reheating temperature, or at substantially that temperature, for a considerable period of time. This may be characterized as allowing the oxid to soak in the heat stored therein. In the case of certain zinc oxids this procedure results in a further substantial improvement in the color of the oxid. For this purpose, a plurality of containers for the oxid are provided so constructed as to restrict the radiation of heat from the material therein. If desired, the containers may be specially constructed to permit of utilizing a heating medium from an external source in holding the material at the elevated temperature to which it has been raised. Thus, the exhaust gases of combustion from the furnace in which the oxid is heated may be carried around the container so as to guard against any substantial drop in the temperature of the contained oxid, for a sufficient period of time.

The features of the invention above referred to in general terms will be better understood by reference to the following description, taken in conjunction with the accompanying drawings, which illustrate a practical embodiment of the invention. It will be understood, however, that the construction herein illustrated and described is merely illustrative of how the features of the invention may be employed and that the invention is not limited as to structural features except as may be indicated by the terms employed in the claims appended hereto. In these drawings;

Figure 1 is an elevation of the furnace and the parts of the heating apparatus employed therewith;

Fig. 2 is an enlarged sectional elevation of the upper end of the furnace and the feeding mechanism;

Fig. 3 is a back view of the parts shown in Fig. 2;

Fig. 4 is a horizontal sectional view of the furnace on the section line 4—4 of Fig. 9;

Figs. 5, 6, 7 and 8 are transverse sectional views of the furnace taken on sectional lines 5—5, 6—6, 7—7, and 8—8, respectively, of Fig. 4.

Figs. 9 and 10 are vertical sections of the furnace on the section lines 9—9 and 10—10, respectively, of Fig. 4;

Fig. 11 is a detail view of a portion of the support for the lower end of the furnace shown in Fig. 1; and Fig. 12 is a transverse section taken on section line 12—12 of Fig. 11.

Referring to these drawings, Fig. 1 illustrates the entire apparatus including the furnace building, the furnace mounted therein in an inclined position, an elevator for lifting the material to be heated to the top of the building, a feeder for feeding material to the furnace continuously at the desired uniform rate, ducts for feeding air and gas to the furnace, and ducts for carrying away from the furnace the heated material and also the exhaust products of combustion.

In Fig. 1, the furnace is indicated at 13. It is of rectangular form and is mounted in an inclined position, as shown, within the heater building 14. The elevator is shown at 15. Its endless belt of buckets or other conveying devices is driven from a motor 16 through belts or chains 17 and the discharge 18 from the elevator is directed laterally so that the material issuing therefrom will discharge into a hopper 19, whatever may be the position of that hopper within the limits of its range of movement as hereinafter described.

The heating or treatment chamber of the furnace 13 consists of a tube or flue of oval or elliptical cross-section extending therethrough from the upper end of the inclined furnace down to the lower end. A feeder supplies the material from the hopper 19 to the upper end of this tube or flue and the material passes by gravity through the flue to the outlet 20 from the furnace. Gas is supplied to the furnace at the lower end thereof and is burned in flues extending upwardly through the furnace parallel to the tube through which the material to be heated passes. The products of combustion then pass into exhaust flues extending back to the lower end of the furnace and then out to a stack. The furnace is also provided with a flue to which air is admitted at the upper end of the furnace and this air, after being heated by the exhaust gases, enters the gas flues at the lower end of the furnace so as to mix with the gas therein and form a combustible mixture.

The construction of the furnace is illustrated in detail in Figs. 4 to 12. It is mounted on three I-beams 21, extending lengthwise of the furnace and tied together by a beam 22 at the inlet end. The furnace is built up from fire brick and refractory tiles to form the heating tube 23 for the material to be heated, combustion flues 24 and 25 above and below the tube 23, exhaust flues 26 and 27, and an air flue 28 located between the two exhaust flues. Around the furnace built up in this form from suitably shaped refractory bricks, is a packing or lining 29 of an asbestos composition. The entire furnace structure thus built up is inclosed between sheet metal plates 30 suitably secured together and mounted upon the supporting beams 21 preferably in the manner illustrated in the drawings. At each end of the furnace is an end plate 31 ribbed to give it greater strength and secured to the other parts of the metal casing of the furnace. To further strengthen the structure a pair of beams 32 are provided extending vertically over the plate 31 at the outlet end of the furnace, these beams having their lower ends secured to two of the bottom beams 21. The upper ends of the beams 32 are connected by stay rods 33 to the transverse beam 22 at the inlet end of the furnace.

The tubular member 23 of the furnace, through which the material to be heated passes, is built up from similar tiles of a semi-oval or semi-elliptical shape, thus forming a passage of oval or elliptical cross-section so disposed that its major axis is horizontal. The edges of these tiles rest upon the center wall 34 and one side wall 35 of the furnace, thus forming the gas flues 24 and 25 above and below the flue 23. At the inlet end of the furnace, the tubular passage 23 alines with an opening in the end plate 31 of the furnace, as shown in Figs. 4 and 9. At the opposite end of the furnace tube 23 alines with an opening in the end plate 31 with which opening the outlet tube 20 also communicates. The flue 28 for air also communicates at the upper end of the furnace with an opening in the end plate 31 and a tube 36 is connected to the end plate in communication with the opening therethrough.

Air is supplied to the flue 28 through the tube 36 and the opening in the end plate 31 by a pipe 37 (Fig. 1) leading from the compressed air supply pipe 38. At the lower end of the furnace, this flue 28 communicates with the two flues 24 and 25 as is best indicated in Fig. 5, from which it will be seen that the central wall 34 is cut away at the lower end of the furnace to provide openings as indicated in Fig. 5, whereby air which has passed through the flue 28 to the lower end of the furnace may then flow laterally through the openings 39 to the gas flues 24 and 25.

Gas is admitted to these flues 24 and 25 through lateral openings in the side of the furnace, which openings are connected by passages 40 to a gas supply duct 41 to which gas is supplied by a branch pipe 42 (Fig. 1) from the main gas supply conduit 43. The passages 40, through which the gas flows from the conduit 41 to the flues 24 and 25, are provided with adjustable dampers 44 as shown in Figs. 4 and 5, which may be moved to any desired position to control the rate of flow of gas into the furnace.

The gas admitted to flues 24 and 25 through the connections 40, and the air admitted to those flues from flue 28 through passages 39, become mixed together within the flues 24 and 25 and are burned therein while passing upwardly on either side of the flue 23. At the upper end of the furnace the exhaust products pass laterally from the flues 24 and 25 into the exhaust flues 26 and 27. The passages through which the products thus pass into the flues 26 and 27 are shown at 45 in Fig. 8, and also in Figs. 4 and 10. Within flues 26 and 27 these exhaust products flow downwardly to the outlet end of the furnace on either side of the flue 28 for the incoming air, so that this air is adequately heated before being combined with the heating gases. At the lower end of the furnace the exhaust products pass laterally through openings in the side of the furnace into passages 46 opposite the passages 40 to a duct 48 similar to the duct 41. These passages 46 are provided with dampers 49 as shown in Figs. 4 and 5. The exhaust duct 48 leads downwardly as shown in Fig. 1 to an underground flue leading to the stack.

The furnace thus constructed is mounted in an inclined position so that the material will pass therethrough by gravity and in order to permit of adjustment of the rate of flow of the material through the furnace, and, therefore, the degree to which the material will be heated, the furnace is so mounted that its angular position may be adjusted as desired. For this purpose two of the beams 21, on which the furnace is mounted, have brackets 49 secured to the undersides thereof and a rod 50 (Figs. 2 and 3) extends through openings in these brackets.

The ends of this rod are received in openings in brackets 51 which are mounted upon beams of the heater building. Thus the furnace structure as a whole may be turned about the rod 50 as a pivot to any desired angular position. When the desired position has been selected, the furnace is sustained in position by means of an extensible supporting leg connected to the lower end of the furnace and constructed as indicated in Figs. 1, 10, 11 and 12. The leg consists of two telescopic parts 52 and 53, the upper of which fits within the lower as shown in detail in Fig. 12. When these two parts have been telescoped to the desired degree, they are secured together by means of bolts 54 passing through openings in the two parts. The lower end of the part 52 is pivotally mounted upon a base plate 55 as shown in Fig. 1. The upper end of the part 53 is pivotally connected to a bracket 56 secured to the beams 21 supporting the furnace.

The feeding apparatus for feeding material continuously to the furnace at the desired rate includes a trough 57 at the lower end of the hopper 19 and a motordriven screw 58 in this trough. The hopper 19 is mounted upon a frame 59, the supporting legs of which are provided with rollers 60 running upon rails 61. An electric motor 62 is mounted upon the frame 59 and is connected by gearing 63 to the shaft 64 of the screw 58. This shaft is adapted to rotate in bearings, one of which is formed in the end-piece of the trough 57 and the other of which is formed in a bracket mounted within the trough 57 as shown at 65. Beyond the end of the screw 58 the trough 57 is provided with a gate 66 whereby the feed of material through the trough may be partially or completely cut off, and if desired, the hopper 19 may have a similar gate 70.

The trough 57 is provided with an extension 67 which is pivotally connected to the lower end of the trough so that it may be moved to the position shown in full lines in Fig. 2, or to that shown in dotted lines in that figure, the extension being sustained in the dotted line position by a pivoted hook 68. The extension 67 is so shaped that the passage therethrough is contracted to a size corresponding with the size of the tubular passage through the furnace for the material to be heated. On the contracted end of the extension 67 is a telescoping sleeve 69.

With the parts thus constructed, and with the extension 67 of the conveyer trough in the inoperative dotted line position, the furnace is moved about the rod 50 to the desired angular position and is thereafter sustained in that position by the supporting leg, consisting of the two telescoping parts 52 and 53, which parts are moved to the proper relative positions and then locked together. The extension 67 of the feeder trough is then released from the hook 68 and turned to the operative position shown in full lines in Fig. 2. Then the entire feeding mechanism carried by the traveling frame 59 is moved along the rails 61 to the proper position with reference to the new angular position of the furnace.

After the carriage 59 has been properly positioned, it is locked against movement and the extensible sleeve 69 on the end of the extension 67 of the feeder trough is moved forward upon the end of the extension 67 so as to project its end into the opening of the end plate 31 of the furnace. In this way a smooth connection is established from the trough 57 of the feeder to the tube of the furnace through which the material to be heated passes, and the possibility of material becoming trapped in this passage is practically eliminated.

The wires by which current is supplied to the motor 62 have sufficient slack therein to permit of the necessary movements of the carriage 59, as is indicated in Fig. 1. Also, the discharge outlet 18 from the elevator is directed laterally so that in all positions of the carriage 59 the material will drop from the outlet 18 into the hopper 19.

The operation of the apparatus thus constructed has been in part indicated in connection with the foregoing description. The zinc oxid to be heated is raised by the elevator 15, discharged into the hopper 19, and fed by the motor-driven screw 58 through the trough 57 and its extension 67 and 69 to the furnace. The construction of the screw feeder and the rate at which it is driven determine the rate at which the material is fed to the furnace and the material is supplied at this rate continuously and uniformly.

Within the furnace the oxid spreads out in a relatively thin layer by reason of the elliptical cross-sectional shape of the flue 23 through which it passes, and it moves along through the flue 23 by gravity at an even rate determined by the angle of inclination of the furnace. As a result of its gliding or sliding movement through the flue 23, the oxid is agitated to a degree sufficient to insure uniformity of heating, and the character and speed of this movement is so controlled by the inclination of the furnace that no objectionable balling or granulation of the material takes place.

While passing through the tubular heating chamber or flue 23 of the furnace, the material is heated by the combustion of gases above and below the tubular chamber 23 in the flues 24 and 25. These gases are supplied from the main pipe 43 through branch pipe 42, header 41 and passages 40, and their flow is controlled by the gate valves 44. Air enters the apparatus from the supply pipe 38 through the branch 37 and passes through the flue 28 and passages 39 to the combustion flues 24 and 25. The exhaust products from the combustion flues 24 and 25 pass through lateral openings 45 to the flues 26 and 27 and from these flues through passages 46 and conduit 48 to the stack. The air passing through the flue 28 is heated by the exhaust products in the flues 26 and 27.

The treated oxid passes from the furnace through the discharge pipe 20, which is open at its lower end. There is also provided an opening for the exit of air from the tubular heating chamber 23 at the upper end of the furnace, as indicated at 82 in Fig. 2. This permits of an upward flow of air through the passage while the oxid is passing downwardly therethrough. The upwardly moving current of air continually renews the supply of oxygen to the oxid undergoing treatment and also offers an appreciable resistance to the passage of the oxid particles through the inclined heating chamber and thus decreases the speed or velocity of their downward movement.

The treated oxid is received in plain uninsulated pans, or, in certain cases, in containers specially constructed so as to preclude to a marked degree the radiation of heat therefrom. Thus, in Fig. 1, a container 84, shown in the form of a truck mounted on rails, is arranged under the discharge outlet 20 of the furnace. This container 84 is of a double wall type and provision is made for carrying the hot products of combustion from the furnace, or a portion thereof, through the space between the two walls of the container. For this purpose a coupling is shown at 85 for connecting the space between the walls of the container with the exhaust conduit leading from the duct 48 to the stack. During the operation of the apparatus, and while the container 84 is being filled, the hot products of combustion from the furnace pass through the duct 48 and around the inner wall of the container, so as to maintain the oxid in the container at its elevated temperature. When the container 84 has been filled, it is disconnected from the exhaust conduit by means of the coupling 85. A cover is then placed over the upper end of the container and the container is moved along on the rails to a convenient position, an empty container 84 being substituted in its place. The cover for the container 84 is also preferably of the double wall type, and it may be provided with a vent to permit the free escape of undesirable vapors given off during the heat soaking operation, which goes on in the container and which may be continued for a period of time of from one to twelve hours depending upon the character of the product.

It will be noted that the oxid is treated in a continuous process whereby a high output of the reheated oxid is obtained. All of the oxid is similarly subjected to the heating medium, as a result of which the requisite uniformity in the degree of reheating is attained, and the product produced is of a substantially uniform and homogeneous character.

The angle of inclination, from the vertical, of the tubular furnace, is always such that the particles of zinc oxide are kept in downward motion through the heating chamber solely by the action of gravity. Thus, as a result of gravity, and without mechanical agitation, jarring or shaking of the furnace or of the material being treated, the particles of oxid slide, glide or tumble along through the furnace, in much the same manner that granular material passes down an inclined chute. In this manner the particles are kept in constant motion during their passage through the inclined tubular furnace, and, since the traveling layer of particles is relatively thin, the particles are brought in intimate and practically constant contact with the highly heated bottom wall of the heating chamber, and are thus uniformly and effectively heated. The movement of the particles of zinc oxide through the inclined tubular furnace should be swift enough to prevent nodulizing or granulating of the particles, and the angle of inclination of the tubular furnace is accordingly determined with this point in view. In general, the most suitable angle of inclination in the case of any particular furnace is that which insures a sufficiently rapid progress of the material through the inclined tubular furnace to prevent nodulizing, and which at the same time requires the material, by reason of the contact friction, to remain under the heating influence for a sufficiently long period of time to effect the desired reaction or treatment.

Throughout the apparatus, adequate provision is made for effecting adjustments to meet varying conditions. Provision is made for adjusting the angular inclination of the furnace so as to regulate the period of time required for the passage of the oxid through the furnace, as explained in the preceding paragraph.

Proper reheating of the oxid during its passage through the tubular furnace is insured by making the furnace of adequate length, for instance, about 35 feet, and by heating the walls of the passage through which the oxid flows, to a sufficiently high temperature, such, for example, as that corresponding to a dull red or a bright yellow color.

The oxid issuing from the outlet of the furnace, and accumulating in the container, is at a temperature of approximately 600° C. to 650° C., and it remains at or near this temperature for a considerable time in the container, during the soaking operation. At the end of the soaking, the oxid may be withdrawn from the container and cooled quickly, or otherwise cooled.

The process of the invention, as described, has been found adapted to treat to advantage different zinc oxids including oxids substantially free from lead, as well as oxids containing appreciable amounts of lead. As previously stated, the zinc oxid may be subjected to only the reheating operation, in which event the material is collected at the bottom of the tubular retort in plain open pans and either cooled quickly or allowed to cool down naturally, or, in the case of certain zinc oxids, the reheating operation may be followed by the soaking operation. In the reheating operation, the oxid is subjected to a high temperature, under oxidizing conditions, with a corresponding improvement in its properties so that it is available for use, if desired, without further treatment than cooling. In the soaking operation, the preheated or reheated oxid is maintained at an elevated temperature in its own atmosphere for a considerable period of time, as hereinbefore described, whereby, in the case of certain zinc oxids, a further substantial improvement in the product is effected. This further improvement takes place slowly, requiring usually several hours. It is more rapid during the early period of the soaking, but with most of the oxids treated, a marked change has been noted after each hour period up to six hours.

The effect of passing the zinc oxid through an inclined heating chamber, in accordance with the present invention, is to decrease the velocity with which the material passes through the furnace, as compared to its velocity when falling freely and unobstructed through a vertical heating chamber. Thus, in passing the oxid through the inclined heating chamber, in contradistinction to the vertical heating chamber described in our aforementioned application, the material may be subjected to the heating influence for a longer interval of time, with the same furnace length; or a shorter length of heating chamber may be used for securing a heat treatment of the same duration. In describing the furnace illustrated in the accompanying drawings as of about 35 feet in length, it will of course be understood that we do not intend to limit ourselves to that particular length, since, in practice, the length of the furnace may vary from this particular length without departing from the spirit of the invention.

We claim:

1. The process of treating zinc oxid, which comprises permitting the oxid to slide by the action of gravity alone and without mechanical agitation through a chamber so disposed that a certain resistance is offered to the passage of the oxid therethrough by friction due to contact of the particles of the oxid with the walls of the chamber, and heating the oxid during its passage through the chamber; substantially as described.

2. The process of treating zinc oxid, which comprises permitting the oxid to slide by the action of gravity alone through a chamber do disposed that a certain resistance is offered to the passage of the oxid therethrough by friction due to contact of the particles of the oxid with the walls of the chamber, heating the oxid during its passage through the chamber, and maintaining the oxid at the elevated temperature to which it is raised in its passage through the chamber for an extended period of time thereafter; substantially as described.

3. The process of treating zinc oxid, which comprises passing the oxid by gravity and in the form of a relatively thin stream through a chamber inclined at such an angle that a certain resistance is offered to the passage of the oxid therethrough by friction due to contact of the particles of the oxid with the walls of the chamber and with one another, and maintaining the walls of the chamber at a high temperature whereby the oxid is heated during its passage therethrough, substantially as described.

4. The process of treating zinc oxid, which comprises passing the oxid by gravity and in the form of a relatively thin stream through a chamber inclined at such an angle that a certain resistance is offered to the passage of the oxid therethrough by friction due to the contact of the particles of the oxid with the walls of the chamber and with one another, maintaining the walls of the chamber at a high temperature whereby the oxid is heated during its passage therethrough, and maintaining the oxid at the elevated temperature to which it is raised in its passage through the chamber for an extended period of time thereafter; substantially as described.

5. The process of treating zinc oxid, which comprises supplying the oxid continuously to the upper end of an inclined tube, maintaining the walls of the tube at a high temperature, allowing the oxid to pass freely by the action of gravity alone through the tube so that it is heated during its passage through the tube, and adjusting the time required for the passage of the material through the tube by regulating the angular position of the tube from the vertical; substantially as described.

6. The process of treating zinc oxid, which comprises supplying the oxid continuously to the upper end of an inclined tube whereby the oxid passes by the action of gravity alone through the tube, heating the oxid during its passage through the tube by conveying gas and air to a flue parallel and adjacent to the tube, burning the mixture of gas and air in the flue and utilizing the exhaust products of combustion from the flue for heating the air admitted to the flue; substantially as described.

7. The process of treating zinc oxid, which comprises supplying the oxid continuously to the upper end of an inclined tube, conveying gas and air to a flue parallel and adjacent to the tube, burning the mixture of gas and air in the flue, utilizing the exhaust products of combustion from said flue for heating the air admitted to the flue, and allowing the oxid to pass by the action of gravity alone through the tube whereby the oxid is heated during its passage through the tube; substantially as described.

In witness whereof we affix our signatures.

FRANK G. BREYER.
EARL H. BUNCE.